_UNITED STATES PATENT OFFICE._

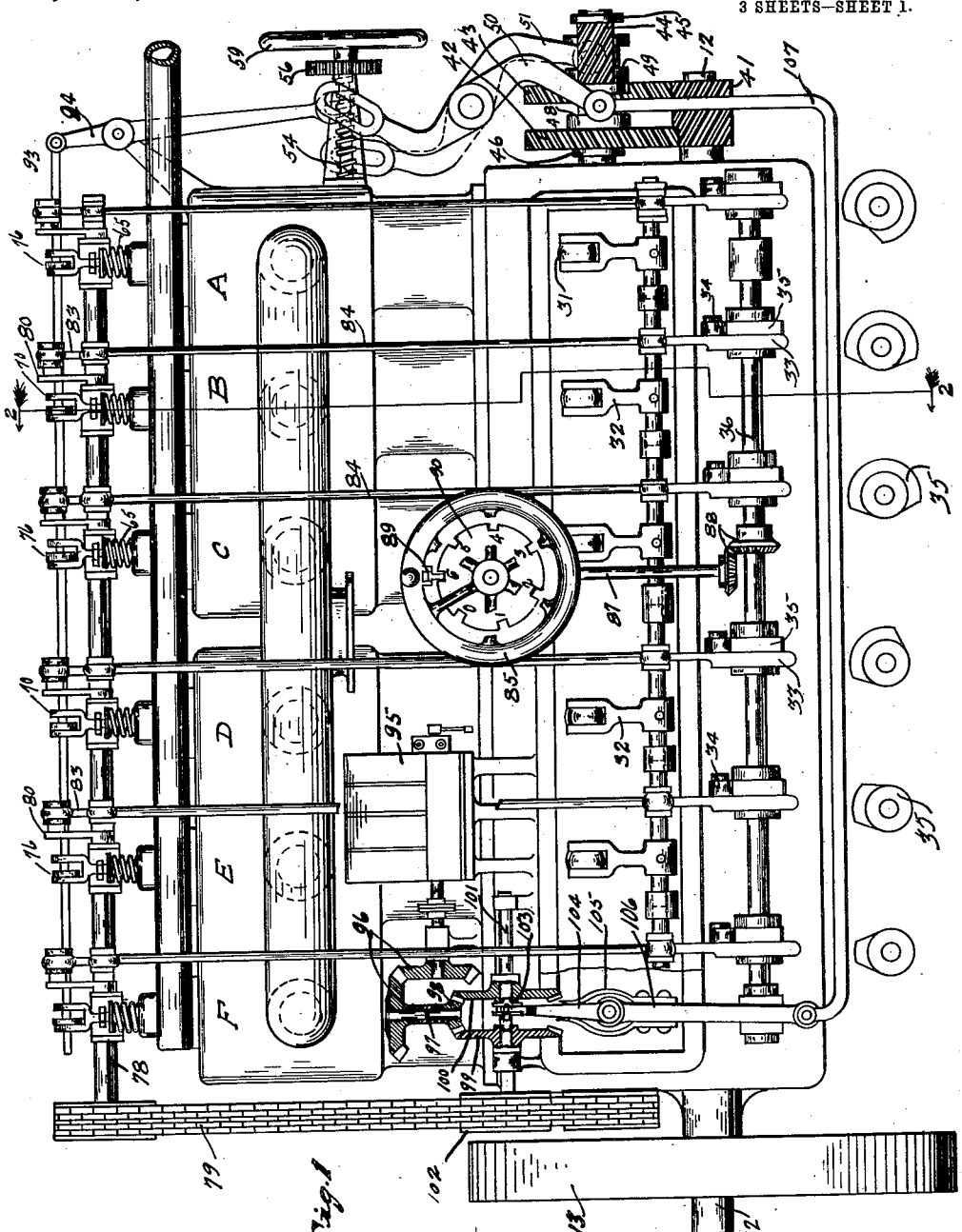

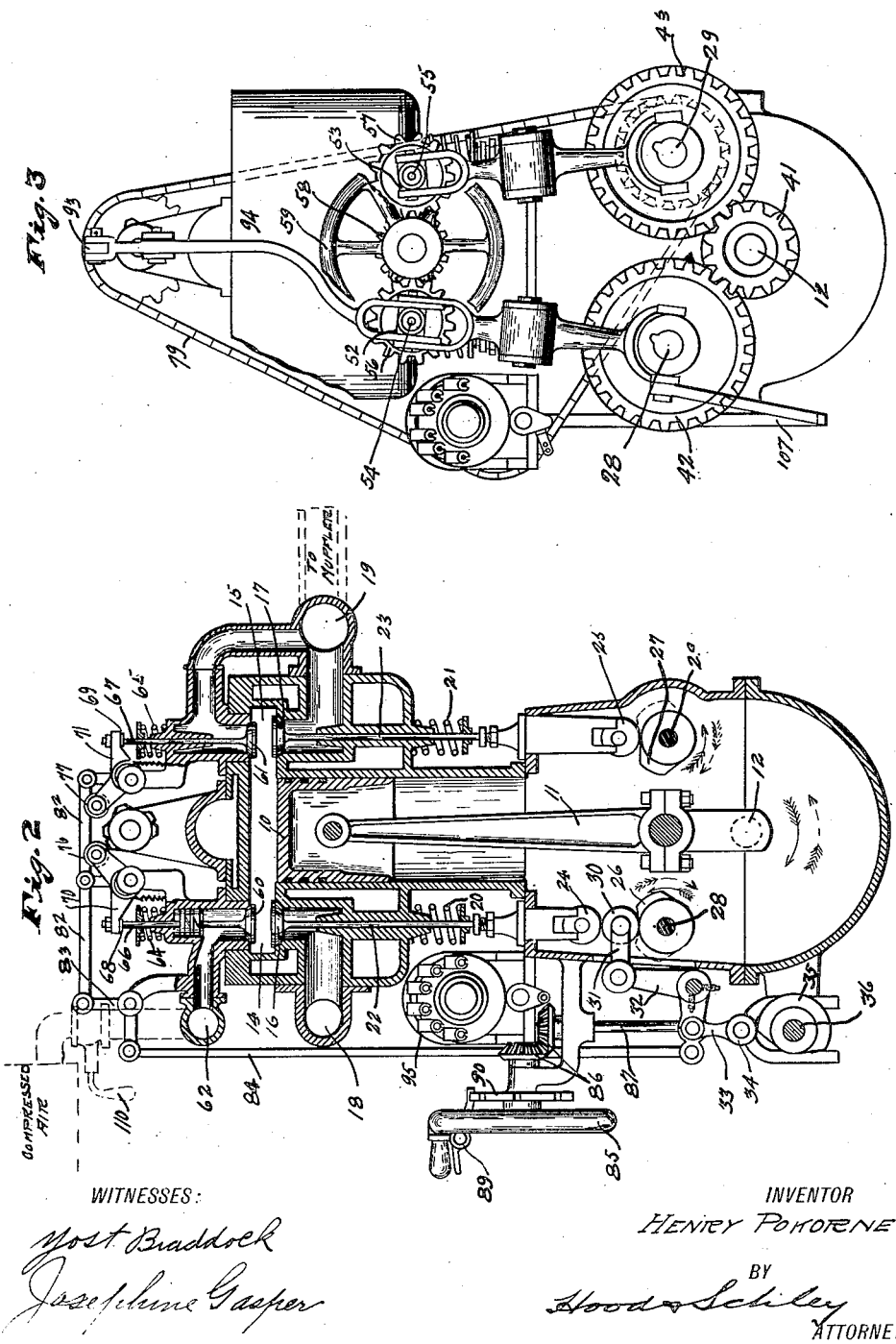

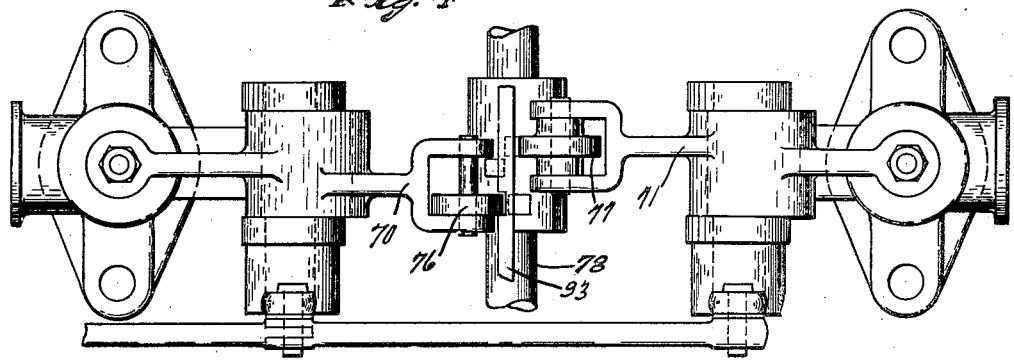
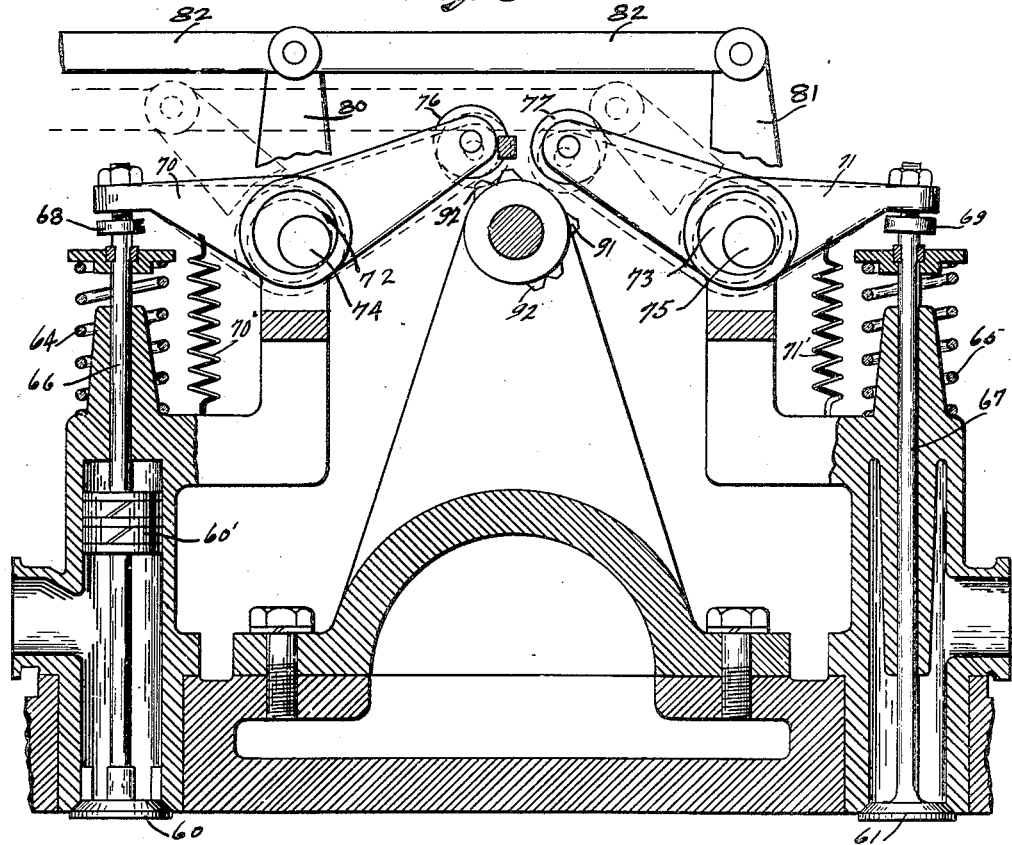

HENRY POKORNEY, OF INDIANAPOLIS, INDIANA.

REVERSIBLE INTERNAL-COMBUSTION ENGINE.

1,134,225.

Specification of Letters Patent.

Patented Apr. 6, 1915.

Application filed May 21, 1914. Serial No. 839,964.

*To all whom it may concern:*

Be it known that I, HENRY POKORNEY, a citizen of the United States, residing at Indianapolis, in the county of Marion and State of Indiana, have invented a new and useful Reversible Internal-Combustion Engine, of which the following is a specification.

It is the object of my invention to provide an internal combustion engine which can readily be reversed; which can be started in either direction by fluid pressure, conveniently supplied directly to the cylinders of the engine; which can be changed gradually from its starting condition as an engine operated by fluid pressure to its running condition as an internal combustion engine; and which when operated by fluid pressure has a greater proportion of power strokes than when operated as an internal combustion engine; thus making the engine especially adapted for operating traction cars, as on interurban railroads. I attain this object by the construction shown in the accompanying drawings, which illustrate one embodiment of my invention.

In these drawings, Figure 1 is a side elevation of an engine embodying my invention, some parts being broken away for the sake of clearness of illustration, and the cams on the starting cam shaft being shown below their regular positions in end elevation in addition to being shown in their regular positions in side elevation; Fig. 2 is a section on the line 2—2 of Fig. 1; Fig. 3 is a front end elevation of the engine shown in Fig. 1, some of the parts being omitted for the sake of clearness; Fig. 4 is an enlarged partial plan view, showing the construction at the top of one of the cylinders of the engine shown in Fig. 1; and Fig. 5 is an enlarged partial end elevation, partly in section, of that part of the structure which is shown in Fig. 4.

The engine is shown as having six cylinders, A, B, C, D, E, and F, these being illustrated as cast in groups of three *en bloc*. Within each cylinder is the usual piston 10, connected by a pitman 11 to the corresponding crank on the crank shaft 12, which may be provided with the usual fly wheel 13. The space above the piston 10 in each cylinder communicates with an inlet passage 14 and an exhaust passage 15, and into these passages open upwardly an inlet valve 16 and an exhaust valve 17 which when open connect the corresponding inlet and exhaust passages to an inlet manifold 18 and an exhaust manifold 19, respectively, the inlet manifold 18 being suitably supplied with explosive mixture, as from a carbureter, and the exhaust manifold being suitably connected, as through a muffler, to the point of discharge. The inlet and exhaust valves 16 and 17 are suitably spring-pressed to closed position, as by springs 20 and 21 respectively, and their valve stems 22 and 23 are provided at their lower ends with rollers 24 and 25 respectively. These rollers 24 and 25 of each cylinder are operated respectively by cams 26 and 27, the cams 26 all being mounted on an inlet cam shaft 28 and the cams 27 all being mounted on an exhaust cam shaft 29. The exhaust cams 27 operate directly on the rollers 25, but each inlet cam 26 operates on its coöperating roller 24 through an intermediate roller 30, which is mounted on an arm 31 pivoted to one arm of a bell-crank lever 32, the other arm of which has pivoted thereto an arm 33, which at its lower end carries a roller 34 bearing on the surface of one of a series of cams 35 on a starting cam shaft 36, the cams 35 for the different cylinders being differently shaped as shown at the bottom of Fig. 1. The operation of this starting cam shaft 36 will be explained more fully hereinafter.

On the crank shaft 12, conveniently at the front end of the engine, is mounted a spiral gear 41, with which mesh two spiral gears 42 and 43 carried by the inlet and exhaust cam shaft 28 and 29 respectively. The gear ratio is shown as the usual 2–1 ratio. The spiral gears 42 and 43 are not fixed on the cam shafts on which they are mounted, however, but are provided with internal screw threads which coöperate with screw threads 44 on these cam shafts, the cam shafts at the ends of these screw threads being provided with collars 45 and 46 for limiting the movement of the spiral gears 42 and 43 along the threads 44. The direction of the screw threads forming the teeth on the exterior of the spiral gears 42 and 43 is the reverse of that of the screw threads 44, the teeth on the spiral gears 42 and 43 being shown as left hand threads while the screws 44 are shown as right hand screws. By this arrangement a rapid change in the angular position of the cam shafts with relation to the crank shaft may be obtained with a small axial movement, for by shifting either of the screws 42 or 43 along its screw 44, (the crank shaft 12 being assumed to be stationary for simplicity,) such spiral gear is caused to rotate about its axis and also causing the cam shaft within it to rotate in the same direction about its axis relatively to such spiral gear; assuming that the pitch of the screw 44 is the same as that of the spiral gears 42 and 43, a given movement of either of these spiral gears along its axis causes it to rotate through a definite angle about its axis and causes its coöperating cam shaft to rotate in the same direction about its axis through twice that angle. Thus to produce a given angular movement of either cam shaft, it is only necessary to move the spiral gear 42 or 43 axially through half the distance it would have to move if it were fast on its cam shaft. By reason of this angular movement of the cam shafts 28 and 29, the relative positions of the cams for a given position of the pistons in their cycle of movement may be changed, and by properly controlling their angular movement this relative position may be made what it should be for opposite directions of rotation of the engine. Thus with the spiral gears 42 and 43 in the position shown in Fig. 1, the cams 26 and 27 for the cylinder B at the completion of its exhaust stroke with the crank shaft moving in the direction shown by the full line arrow is as shown in full lines, while by shifting the spiral gears 42 and 43 in opposite directions along their axes so as to produce opposite angular movements of their associated cam shafts respectively, the cams 26 and 27 for the same position of the piston 10 of the cylinder B are changed to the position shown in dotted lines, which is the proper position for them to have at the completion of the exhaust stroke of the piston 10 in the direction shown by the dotted arrow. This angular movement of the two cam shafts 28 and 29 may or may not be equal, depending on the design of the engine, different angular movements of the two cam shafts being obtained by making different the axial distance through which the two spiral gears 42 and 43 move or by making different the pitch of the screw 44 on the two cam shafts 28 and 29.

The axial movement of the spiral gears 42 and 43 may be obtained in different ways, but conveniently is obtained by providing these gears with grooved collars 48 and 49 which coöperate with the forked lower ends of arms 50 and 51 respectively, the forked upper ends of which arms are slotted to fit over and receive pins carried by nuts 52 and 53 on right and left hand screws 54 and 55. These screws are conveniently mounted for rotation on the engine frame and have fixed thereon gears 56 and 57 respectively, both of which gears mesh with a gear 58 operable by a hand wheel 59, by the turning of which the screws 54 and 55 are thus operated to cause an axial shifting of the spiral gears 42 and 43.

The inlet and exhaust passages 14 and 15 of each cylinder are also provided with valves 60 and 61 respectively, these valves conveniently being directly above the valves 16 and 17 respectively. The valves 60 control the connection of the inlet passages 14 to a supply conduit 62 for fluid pressure, which is conveniently compressed air, while the valves 61 control another connection between the exhaust passages 15 and the exhaust manifold 19. The valves 60 and 61 normally remain closed, being held so by the springs 64 and 65 respectively; the inlet valve 60 also being connected to a piston 60' against which the air pressure from the supply conduit acts in the opposite direction from that in which it acts on the valve itself, so that the air pressure will not force the valve open accidentally. Against the upper ends of the valve stems 66 and 67 of the valves 60 and 61 bear heads of adjusting screws 68 and 69 carried by bell-crank levers 70 and 71 respectively, these bell-crank levers being pivoted on eccentric portions 72 and 73 of shafts 74 and 75 respectively, which are separate for each cylinder of the engine; light springs 70' and 71' insure that the screws 68 and 69 always engage the valve stems 66 and 67. By turning the shafts 74 and 75, the associated bell crank levers 70 and 71 may be raised or lowered so that rollers 76 and 77 carried by their opposite ends from those which carry the screws 68 and 69 may be raised to clear or lowered to be operated by cams on a cam shaft 78 which extends along the top of the engine over the various cylinders, such cam shaft being driven in any suitable manner from one of the cam shafts 28 and 29, as by a chain 79 engaging sprockets of proper ratio on the cam shafts 29 and 78.

The movement of the shafts 74 and 75 to make the rollers 76 and 77 operative or inoperative is obtained by arms 80 and 81 fixed on the shafts 74 and 75, these arms 80 and 81 being connected by links 82 to one arm of a bell-crank lever 83, the other arm of which is connected by a link 84 to that arm of the corresponding bell-crank lever 32 which carries the arm 33. Thus by turning the starting cam shaft 36, the cams 35 thereon either allow the bell-crank levers 32 to turn in a counter-clockwise direction to withdraw the rollers 30 from between the cams 26 and the rollers 24 and to lower the pivotal points of the bell-crank levers 70 and 71 to cause such levers and the valves 60 and 61 to be operated by the cams on the cam shaft 78, or move such bell-crank levers 32 in a clockwise direction to insert the rollers 30 between the cams 26 and rollers 24 and to raise the pivotal points of the bell-crank levers 70 and 71 to make the latter inoperable by the cams on the cam shaft 78. When any arm 32 is moved in a counter-clockwise direction, the corresponding cylinder is changed from an internal combustion engine to a fluid-pressure operated engine, while when it is moved in a clockwise direction it changes the corresponding cylinder from a fluid-pressure operated engine to an internal combustion engine. In order that this change may be a gradual one, some of the cylinders being changed before others, or a complete one, with all the cylinders changed at once, the cams 35 are made with their high portions of different angular lengths, as shown at the bottom of Fig. 1, the inclines leading up to such high portions at one end being all in the same angular position so as to raise or lower various rollers 34 simultaneously, while the inclines at the other ends of such high portions are angularly spaced on the different cams, to raise or lower the different rollers 34 in succession, according as the starting cam shaft 36 is turned in one direction or the other from the positions in which it has all of the cylinders operating as fluid-pressure operated engines or as internal combustion engines. Thus with the six cylinder engine shown, the starting cam shaft 36 has seven positions in which it respectively makes none, one, two, three, four, five, and six of the cylinders fluid-pressure operated engines, with the remaining cylinders in each case internal combustion engines, the starting cam shaft being movable in either direction from any position. The cam shaft is shown as being movable by a hand wheel 85, which may be located at any desired place and is suitably connected, as through bevel gearing 86, a vertical shaft 87, and bevel gearing 88, to the starting cam shaft 36, the hand wheel 85 carrying a spring latch 89 which coöperates with a fixed notch plate 90, in which are seven notches for the seven positions of the cam shaft 36, each notch being marked with the number of cylinders which with the spring latch in that notch are operating as internal combustion engines.

The cam shaft 78 carries a cam 91 for each roller 77, such cam being so located that when it operates on the roller it does so during the alternate up-strokes of the corresponding piston 10 from those during which the exhaust valve 17 is opened, so that on alternate up-strokes of the piston the exhaust is provided by the valves 61 and 17. This same cam 91 takes care of the opening and closing of the associated valve 61 for both directions of movement of the engine, because the shaft 78 is turned through the same angular movement as is the exhaust cam shaft 29 when the hand wheel 59 is operated. The cam shaft 78 also carries two cams 92 for each roller 76 for each direction of movement of the engine, there being two of these cams for operating the roller 76 for each direction of movement because it is desirable to open the valve 60 to admit air to each cylinder twice during a complete cycle of the movement which the engine would have as an internal combustion engine, or once on each down stroke of the piston 10. Two sets of the cams 92 are provided because with most types of engines the angular movement of the shafts 28, 29, and 78 will not be exactly 90° when changing the direction of movement of the engine, though if such movement were exactly 90° one set of the cams 92 would be sufficient. The rollers 76 are made to coöperate with the proper sets of cams 92 by being mounted for axial movement in the ends of their bell-crank levers 70, as is clear from Fig. 4, such movement being obtained by a longitudinally shiftable notched rod 93 into the notches of which the several rollers 76 project. The rod 93 is conveniently shifted endwise by being connected to one end of a lever 94 the other end of which is connected to one of the nuts 52 and 53, so that the turning of the hand wheel 59 to produce the rotation of the cam shafts 28, 29, and 78 also shifts the various rollers 76 along their axes to make them coöperate with the proper sets of cams 92.

Ordinarily when reversing the engine, it is necessary to change the point in the cycle at which ignition occurs. This is done in the present instance by connecting the shaft of the magneto 95, as by bevel gearing 96, to a shaft 97 which carries a bevel pinion 98 meshing with two bevel gears 99 and 100 which are loose on a shaft 101 driven in some suitable manner at proportional speed with the engine crank shaft 12. In the present instance, this driving is shown as being by a sprocket wheel 102 carried by the shaft 101 and meshing with the chain 79 which interconnects the cam shafts 29 and 78. The various gears are proportioned so as to obtain the desired magneto speed, which for a six cylinder engine is usually one and one half times the crank shaft speed. Either of the bevel gears 99 and 100 may be clutched to the shaft 101 by a sliding clutch member 103 splined on such shaft, such clutch being capable of meshing with the gears 99 and 100 only when the shaft of the magneto 95 is in the proper position with relation to the engine elements to produce ignition at the desired point, this conveniently being obtained by making the clutch member 103 with but one clutch tooth on each side and each gear 99 and 100 with but one notch for receiving such tooth. The clutch member 103 is thrown into engagement with either of the bevel gears 99 and 100 by being mounted on a lever 104, against opposite sides of which bear two leaf springs 105 carried by a lever 106 which is operable by any suitable connections from some part operated by the hand wheel 59. This connection is here shown as being a link 107 which interconnects the lever 106 and the lower end of the lever 50, this link being shown as bent so as not to interfere with the showing of the other parts. Thus when the hand wheel 59 is operated to either limit of its movement, the lever 106 is correspondingly operated, flexing one or the other of the two springs 105 so that it tends to throw the clutch member 103 into engagement with the proper one of the two bevel gears 99 and 100 to drive the magneto properly for that direction of movement of the engine which is about to be obtained, the clutch 103 remaining out of mesh, however, until by the engine movement the proper relationship of the shafts of the magneto and of the engine has been reached.

The parts are shown in the position which they would have for causing the engine to rotate in the direction shown by full arrows in Fig. 2. If the engine is at a standstill, the hand wheel 85 is turned in position 0, to make all the cylinders air-operated engines. By now admitting air to the conduit 62, by proper operation of whatever control valve 110 there may be, air is admitted into the proper cylinders, determined by the position in which the engine happens to be, and the engine starts to operate in the direction of the full arrows, air being admitted from the conduit 62 into the cylinders in proper succession by the valves 60 and being exhausted therefrom at the proper times through the valves 17 and 61. As the engine gains in speed, the operator turns the hand wheel 85 in a counterclockwise direction (Fig. 1) through positions 1, 2, 3, 4, and 5 to position 6, thereby turning the starting cam shaft 36 in a clockwise direction (Fig. 2, and the cams at the lower part of Fig. 1) to change the cylinders successively from air-operated engines to internal combustion engines, in the manner already described. When the hand wheel 85 reaches position 6 all the cylinders are acting as internal combustion engines.

When it is desired to reverse the engine, the latter is stopped, the hand wheel 59 is turned to shift the two nuts 52 and 53 in opposite directions along the screws 54 and 55 to interchange the positions of the levers 50 and 51 to change the relation between the cam shafts 28, 29, and 78 and the crank shaft 12, to shift the several rollers 76 to coöperate with different sets of the cams 92, and to throw the clutch member 103 into position to clutch the bevel gear 99 to the shaft 101 and to free the bevel gear 100 therefrom; also, the hand wheel 85 is turned to position 0 to make all the cylinders air-operated engines. Then air is admitted as before, and the hand wheel 85 is turned to position 6, such turning preferably being by way of positions 1 to 5 inclusive to make the change a gradual one although it may be directly from position 0 to position 6 to make the change in all the cylinders simultaneously.

I claim as my invention:

1. An internal combustion engine, comprising a cylinder, a piston, inlet and exhaust valves for said cylinder, means for operating said valves by the piston operation, means for varying the relation between the piston movement and the valve movement, a mechanical electric generator for providing an ignition spark within said cylinder, means for driving said generator from said piston, and means for varying the relation between the operation of said generator and the operation of said piston simultaneously with the variation between the valve movement and the piston movement.

2. An internal combustion engine, comprising a cylinder, a piston, inlet and exhaust valves for said cylinder, means for operating said valves by the piston operation, means for varying the relation between the piston movement and the valve movement, a mechanical electric generator for providing an ignition spark within said cylinder, means for driving said generator from said piston, and means for varying the relation between the operation of said generator and the operation of said piston to correspond with the change in the relation between the piston movement and the valve movement.

3. An internal combustion engine, comprising a cylinder, a piston, a crank shaft operated by said piston, inlet and exhaust valves for said cylinder, means for operating said valves from the crank shaft, means for varying the relation between the crank shaft movement and the movement of the valves to produce opposite directions of rotation of the crank shaft, a mechanical electric generator driven from said crank shaft, and means for varying the relationship between the movement of said generator and the movement of the crank shaft simultaneously with the variation in the relation between the movements of the valves and the crank shaft.

4. An internal combustion engine, comprising a cylinder, a piston, a crank shaft operated by said piston, inlet and exhaust valves for said cylinder, means for operating said valves from the crank shaft, means for varying the relation between the crank shaft movement and the movement of the valves to produce opposite directions of rotation of the crank shaft, a mechanical electric generator driven from said crank shaft, and means for varying the relationship between the movement of said generator and the movement of the crank shaft to correspond with the direction of crank shaft rotation.

5. An internal combustion engine, comprising a cylinder, a piston, a crank shaft operated by said piston, inlet and exhaust valves for said cylinder, means for operating said valves from the crank shaft, means for varying the relation between the crank shaft movement and the movement of the valves to produce opposite directions of rotation of the crank shaft, a mechanical electric generator driven from said crank shaft, and means for varying the relationship between the movement of said generator and the movement of the crank shaft simultaneously with the variation in the relation between the movements of the valves and the crank shaft, and for maintaining the movement of the generator in the same direction regardless of the direction of movement of the crank shaft.

6. An internal combustion engine, comprising a cylinder, a piston, a crank shaft operated by said piston, inlet and exhaust valves for said cylinder, means for operating said valves from the crank shaft, means for varying the relation between the crank shaft movement and the movement of the valves to produce opposite directions of rotation of the crank shaft, a mechanical electric generator driven from said crank shaft, and means for varying the relationship between the movement of said generator and the movement of the crank shaft and for maintaining the movement of the generator in the same direction regardless of the direction of movement of the crank shaft.

7. In combination, a cylinder, a piston, an inlet valve and an exhaust valve for admitting explosive mixture to and exhausting gases from such cylinder, an inlet valve and another exhaust valve for admitting fluid under pressure to and for exhausting gases from said cylinder, means for operating said first-named inlet and exhaust valves by the piston movement, means for operating said last-named inlet and exhaust valves by the piston movement, and means for alternatively rendering operative the means for operating the first-named inlet valve and the last-named inlet and exhaust valves, the means for operating said last-named inlet and exhaust valves producing twice as many inlet valve openings as it does exhaust valve openings and producing exhaust valve openings which alternate with the openings of the first-named exhaust valve.

8. In combination, a cylinder, a piston, an inlet valve and an exhaust valve for admitting explosive mixture to and exhausting gases from such cylinder, an inlet valve and another exhaust valve for admitting fluid under pressure to and for exhausting gases from said cylinder, means for operating said first-named inlet and exhaust valves by the piston movement, means for operating said last-named inlet and exhaust valves by the piston movement, and means for alternatively rendering operative the means for operating the first-named inlet valve and the last-named inlet and exhaust valves.

9. In combination, a cylinder, a piston, an inlet valve and an exhaust valve for admitting explosive mixture to and exhausting gases from such cylinder, an inlet valve and another exhaust valve for admitting fluid under pressure to and for exhausting gases from said cylinder, means for operating said first-named inlet and exhaust valves by the piston movement, means for operating said last-named inlet and exhaust valves by the piston movement, and means for alternatively rendering operative the means for operating the first-named inlet valve and the last-named inlet and exhaust valves, said means for operating said first-named valves producing operations thereof in a four-stroke cycle and said operating means for said second-named valves producing an inlet valve opening for each reciprocation of the piston.

10. In combination, a cylinder, a piston, an inlet valve and an exhaust valve for admitting explosive mixture to and exhausting gases from such cylinder, an inlet valve and another exhaust valve for admitting fluid under pressure to and for exhausting gases from said cylinder, means for operating said first-named inlet and exhaust valves by the piston movement in a four-stroke cycle, means for operating said last-named inlet and exhaust valves by the piston movement, and means for alternatively rendering operative the means for operating the first-named inlet valve and the last-named inlet and exhaust valves, the means for operating said last-named inlet and exhaust valves producing twice as many inlet valve openings as it does exhaust valve openings and producing exhaust valve openings which alternate with the openings of the first-named exhaust valve.

11. In combination, a plurality of cylinders and pistons therefor, an inlet valve and an exhaust valve for admitting explosive mixture to and exhausting gases from each cylinder, an inlet valve and another exhaust valve for admitting fluid under pressure to and exhausting gases from each cylinder, means for operating said first-named valves from the operation of the pistons, means for operating said last-named valves from the piston movement, means for selectively and alternatively rendering inoperative the operating means for the first-named inlet valve and the last-named inlet and exhaust valves of the several cylinders, and unitary means for operating said selective means for a plurality of cylinders successively.

12. In combination, a plurality of cylinders and pistons therefor, an inlet valve and an exhaust valve for admitting explosive mixture to and exhausting gases from each cylinder, an inlet valve and another exhaust valve for admitting fluid under pressure to and exhausting gases from each cylinder, means for operating said first-named valves from the operation of the pistons, means for operating said last-named valves from the piston movement, means for selectively and alternatively rendering inoperative the operating means for the first-named inlet valve and the last-named inlet and exhaust valves of the several cylinders, and unitary means for operating said selective means for a plurality of cylinders either successively or simultaneously as desired.

13. In an internal combustion engine, the combination of a cylinder, a piston, a crank shaft operated by said piston, a cam shaft, a valve communicating with the cylinder and operated by said cam shaft, intermeshing spiral gears connected with said crank shaft and said cam shaft respectively, one of said spiral gears being mounted on a screw thread on its shaft and shiftable along said screw thread, said screw thread and the threads formed by the teeth of the spiral gear carried by said screw threads being in opposite directions.

14. In an internal combustion engine, the combination of a cylinder, a piston, a crank shaft operated by said piston, a cam shaft, a valve communicating with the cylinder and operated by said cam shaft, intermeshing spiral gears connected with said crank shaft and said cam shaft respectively, one of said spiral gears being mounted on a screw thread on its shaft and shiftable along said screw thread.

15. In combination, a cylinder, a piston, a crank shaft operated by said piston, inlet and exhaust valves for said cylinder, an inlet cam shaft for the inlet valve, an exhaust cam shaft for the exhaust valve, intermeshing spiral gears connected with said crank shaft and said two cam shafts respectively, said two spiral gears connected with said two cam shafts being mounted on and shiftable along screw threads on their shafts, said screw threads being in opposite directions from the threads formed by the teeth of the corresponding spiral gears.

16. In combination, a cylinder, a piston, a crank shaft operated by said piston, inlet and exhaust valves for said cylinder, an inlet cam shaft for the inlet valve, an exhaust cam shaft for the exhaust valve, intermeshing spiral gears connected with said crank shaft and said two cam shafts respectively, said two spiral gears connected with said two cam shafts being mounted on and shiftable along screw threads on their shafts.

17. In combination, a cylinder, a piston, a crank shaft driven from said piston, two cam shafts, an inlet valve operated by one of said cam shafts for admitting explosive mixture to the cylinder, an exhaust valve operated by the second cam shaft, a third cam shaft, an inlet valve operated by said third cam shaft for admitting fluid under pressure to said cylinder, an exhaust valve also operated by said third cam shaft, and means for alternatively rendering either said first or said third cam shaft operative to work its valves.

18. In combination, a cylinder, a piston, a crank shaft driven from said piston, two cam shafts, an inlet valve operated by one of said cam shafts for admitting explosive mixture to the cylinder, an exhaust valve operated by the second cam shaft, a third cam shaft, an inlet valve operated by said third cam shaft for admitting fluid under pressure to said cylinder, and means for alternatively rendering either said first or said third cam shaft operative to work its valves.

19. In combination, a cylinder, a piston, a crank shaft driven from said piston, two cam shafts, an inlet valve operated by one of said cam shafts for admitting explosive mixture to the cylinder, an exhaust valve operated by the second cam shaft, a third cam shaft, an inlet valve operated by said third cam shaft for admitting fluid under pressure to said cylinder, an exhaust valve also operated by said third cam shaft, means for alternatively rendering either said first or said third cam shaft operative to work its valves, and means for shifting the angular position of said three cam shafts with relation to that of the crank shaft to produce either forward or reverse movement of the crank shaft, said third cam shaft being provided with different cams for operating its inlet valve for the two directions of movement of the crank shaft, and means for associating said inlet valve with different ones of said cams as the relation between the positions of the crank shaft and cam shafts is changed.

20. In combination, a cylinder, a piston, a crank shaft driven from said piston, two cam shafts, an inlet valve operated by one of said cam shafts for admitting explosive mixture to the cylinder, an exhaust valve operated by the second cam shaft, a third cam shaft, an inlet valve operated by said third cam shaft for admitting fluid under pressure to said cylinder, means for alternatively rendering either said first or said third cam shaft operative to work its valves, and means for shifting the angular position of said three cam shafts with relation to that of the crank shaft to produce either forward or reverse movement of the crank shaft, said third cam shaft being provided with different cams for operating its valve for the two directions of movement of the crank shaft, and means for associating said valve with different ones of said cams as the relation between the positions of the crank shaft and cam shafts is changed.

21. In combination, a cylinder, a piston, a crank shaft driven from said piston, two cam shafts, an inlet valve operated by one of said cam shafts for admitting explosive mixture to the cylinder, an exhaust valve operated by the second cam shaft, a third cam shaft, an inlet valve operated by said third cam shaft for admitting fluid under pressure to said cylinder, an exhaust valve also operated by said third cam shaft, means for alternatively rendering either said first or said third cam shaft operative to work its valves, and means for shifting the angular position of said three cam shafts with relation to that of the crank shaft to produce either forward or reverse movement of the crank shaft.

22. In combination, a cylinder, a piston, a crank shaft driven from said piston, two cam shafts, an inlet valve operated by one of said shafts for admitting explosive mixture to the cylinder, an exhaust valve operated by the second cam shaft, a third cam shaft, an inlet valve operated by said third cam shaft for admitting fluid under pressure to said cylinder, an exhaust valve also operated by said third cam shaft, and means for alternatively rendering either said first or said third cam shaft operative to work its valves, means for shifting the angular position of the first two cam shafts with relation to that of the crank shaft to produce either forward or reverse movement of the crank shaft, said third cam shaft being provided with different cams for operating its inlet valve for the two directions of movement of the crank shaft, and means for associating said inlet valve with different ones of said cams as the relation between the portions of the crank shaft and the cam shaft is changed.

23. In combination, a cylinder, a piston, a crank shaft driven from said piston, two cam shafts, an inlet valve operated by one of said cam shafts for admitting explosive mixture to the cylinder, an exhaust valve operated by the second cam shaft, a third cam shaft, an inlet valve operated by said third cam shaft for admitting fluid under pressure to said cylinder, means for alternatively rendering either said first or said third cam shaft operative to work its valves, means for shifting the angular position of the first two cam shafts with relation to that of the crank shaft to produce either forward or reverse movement of the crank shaft, said third cam shaft being provided with different cams for operating its valve for the two directions of movement of the crank shaft, and means for associating said valve with different ones of said cams as the relation between the portions of the crank shaft and the cam shafts is changed.

24. In combination, a plurality of cylinders and pistons, a crank shaft operated by the pistons, an inlet valve for each cylinder, an exhaust valve for each cylinder, an inlet cam shaft, a cam on said inlet cam shaft for each inlet valve, an exhaust cam shaft, an exhaust cam on such exhaust cam shaft for each exhaust valve, means for operating said cam shafts from said crank shaft, and means for angularly shifting said cam shafts in opposite directions relative to each other for a given position of the crank shaft to produce a reversal in the direction of rotation of the crank shaft.

25. In combination, a plurality of cylinders and pistons, a crank shaft operated by the pistons, an inlet valve for each cylinder, an exhaust valve for each cylinder, an inlet cam shaft, a cam on said inlet cam shaft for each inlet valve, an exhaust cam shaft, an exhaust cam on such exhaust cam shaft for each exhaust valve, means of operating said cam shafts from said crank shaft, and means for angularly shifting said cam shafts for a given position of the crank shaft to produce a reversal in the direction of rotation of the crank shaft.

26. In combination, a cylinder, a piston, an inlet valve for admitting explosive mixture to said cylinder, an inlet valve for admitting fluid under pressure to said cylinder, two exhaust valves for exhausting gases from said cylinder, means for operating said valves, by the piston operation, and means for alternately rendering inoperative either the second inlet valve and one of the exhaust valves or the first inlet valve, said last-named exhaust valve being operative when said second inlet valve is operative and the other exhaust valve being operative when either inlet valve is operative, and said valve-operating means producing twice as many operations of the second inlet valve as of the first for a given piston movement and operating said exhaust valves alternately when operating both of them.

27. In combination, a cylinder, a piston, an inlet valve for admitting explosive mixture to said cylinder, an inlet valve for admitting fluid under pressure to said cylinder, two exhaust valves for exhausting gases from said cylinder, means for operating said valves by the piston operation, and means for alternately rendering inoperative either the second inlet valve and one of the exhaust valves or the first inlet valve, said last-named exhaust valve being operative when said second inlet valve is operative and the other exhaust valve being operative when either inlet valve is operative.

In witness whereof, I have hereunto set my hand at Indianapolis, Indiana, this eighteenth day of May, A. D. one thousand nine hundred and fourteen.

HENRY POKORNEY.

Witnesses:
ARTHUR M. HOOD,
JOSEPHINE GASPER.